United States Patent [19]
Ashikian

[11] 3,783,858
[45] Jan. 8, 1974

[54] WIND OPERATED HEATING SYSTEM
[76] Inventor: Baruir Ashikian, 505 Frechette, Sherbrooke, Quebec, Canada
[22] Filed: Sept. 1, 1971
[21] Appl. No.: 177,009

[52] U.S. Cl. .............................................. 126/247
[51] Int. Cl. ............................................. F24c 9/00
[58] Field of Search...................... 126/247; 122/26; 415/2; 62/291

[56] References Cited
UNITED STATES PATENTS
2,761,292  9/1956  Coanda et al..................... 62/291 X

*Primary Examiner*—Meyer Perlin
*Assistant Examiner*—Ronald C. Capossela

[57] ABSTRACT

The pressure decrease resulting from wind's flow around suitably shaped bodies is used in a manner to produce oscillations in a suitably contained mass of liquid and the heat generated by the accompanying viscous dissipation is stored in the liquid and used as needed.

8 Claims, 5 Drawing Figures

PATENTED JAN 8 1974 3,783,858

INVENTOR
BARUIR ASHIKIAN

PATENTED JAN 8 1974

INVENTOR
BARUIR ASHIKIAN

WIND OPERATED HEATING SYSTEM

DISCLOSURE

The invention relates to systems for heating the interior of enclosures intended for any use.

Present heating systems rely mainly on the combustion of petroleum products, but in view of the pressing need to reduce air pollution and delay depletion of petroleum resources, alternate heating sources will draw an ever increasing attention. Moreover, relatively low cost heating is unavailable in places which need it most: the sparsely habitated, very cold regions of the american continent. In such regions, the heat required for any human activity is obtained, amost exclusively, by burning oil transported at very high cost.

My invention is intended to provide an alternate heating method by making use of the almost unlimited wind energy available almost everywhere on the earth's surface and could have an immediate use in the northern regions of North America where significant savings are possible by switching to heating based on free wind energy which has the added advantage of being free of pollution.

Winds have variable intensities and the data gathered in the far North reveals periods of calm stretching for 2 or 3 days; this means that wind operated heating systems must provide adequate storage for the incoming heat.

In my invention, the wind's flow around one or more non rotating streamlined bodies causes a pressure drop at particular locations on their surfaces, this depression being periodically applied, via a cyclic control device, on a heat storing liquid contained within one or more pipes communicating with the control device and immersed in a thermally insulated tank containing the same heat storing liquid. For a certain frequency of this cyclic control, the mass of fluid in the pipes and in the tank is set into an oscillatory resonant motion which produces viscous dissipation and hence heat.

In many applications, another fluid distributes part of this heat throughout the desired space of the enclosure and any excess of heat is stored in the liquid and is used during windless periods.

Further features of my invention will become apparent from the following description and appended claims with reference to the accompanying drawings which show, by way of examples, two embodiments of my invention.

Figures 1, 2, 4, 5:
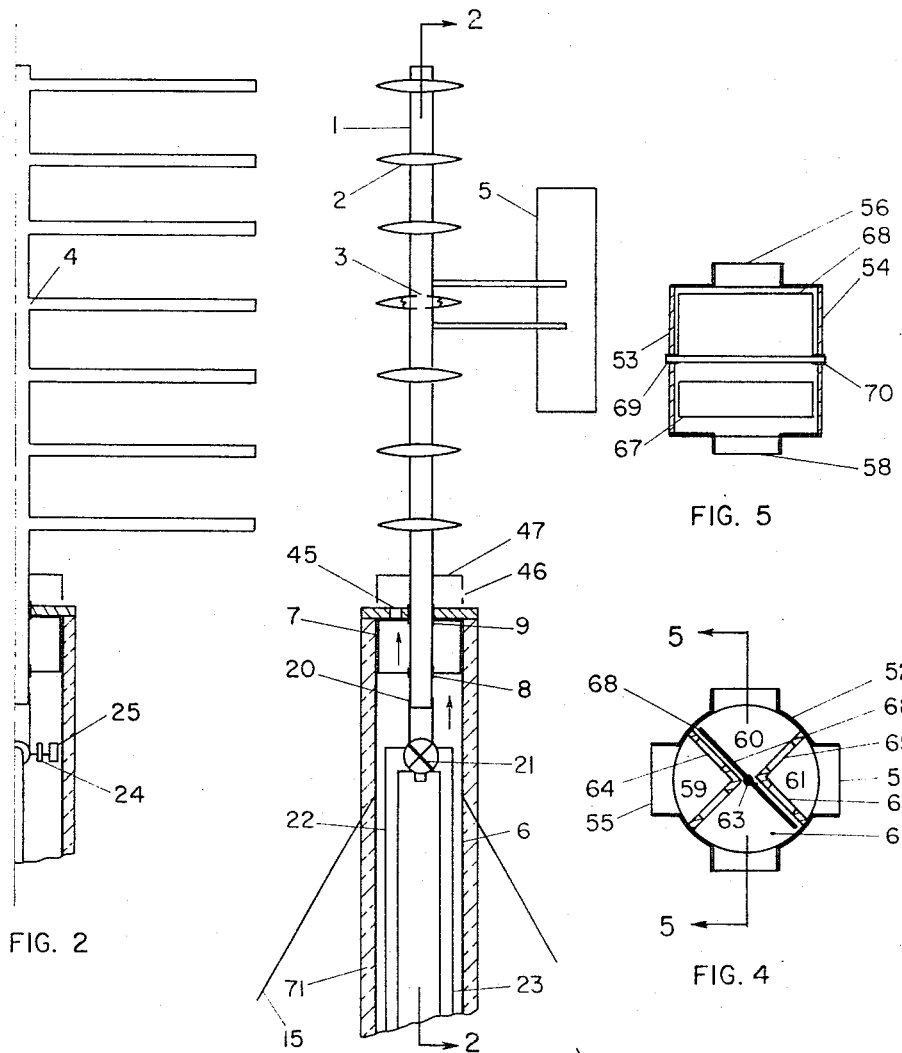
FIG. 1 is a diagrammatic sectional view of a heating system using wind induced oscillations and of the associated enclosure; the wind energy recuperator is self-orienting.
FIG. 2 is a diagrammatic transverse sectional view on the line 2—2 of FIG. 1.
FIG. 4 is a sectional view of a control valve used in conjunction with the liquid oscillator.
FIG. 5 is a longitudinal sectional view on the line 5—5 of FIG. 4.
Figure 3:
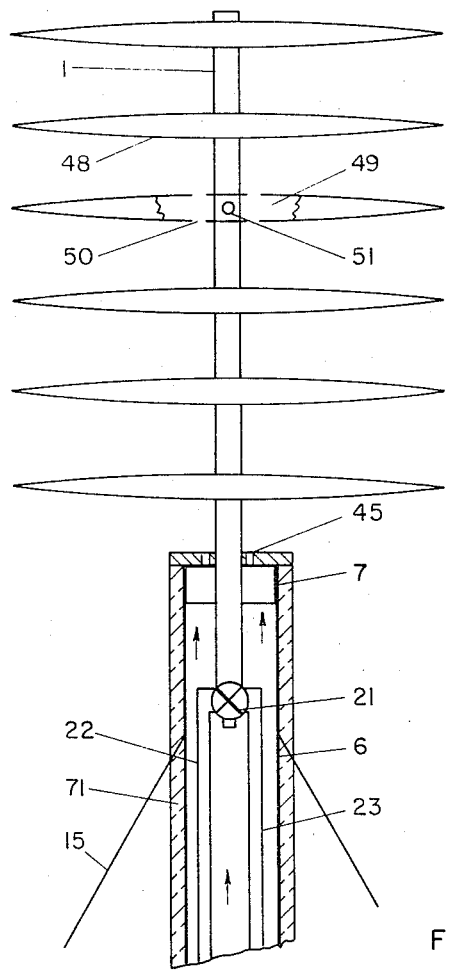
FIG. 3 is a diagrammatic sectional view of a heating system using wind induced oscillations and of the associated enclosure; the wind energy recuperator is fixed and omni-directional.
Figure 3:
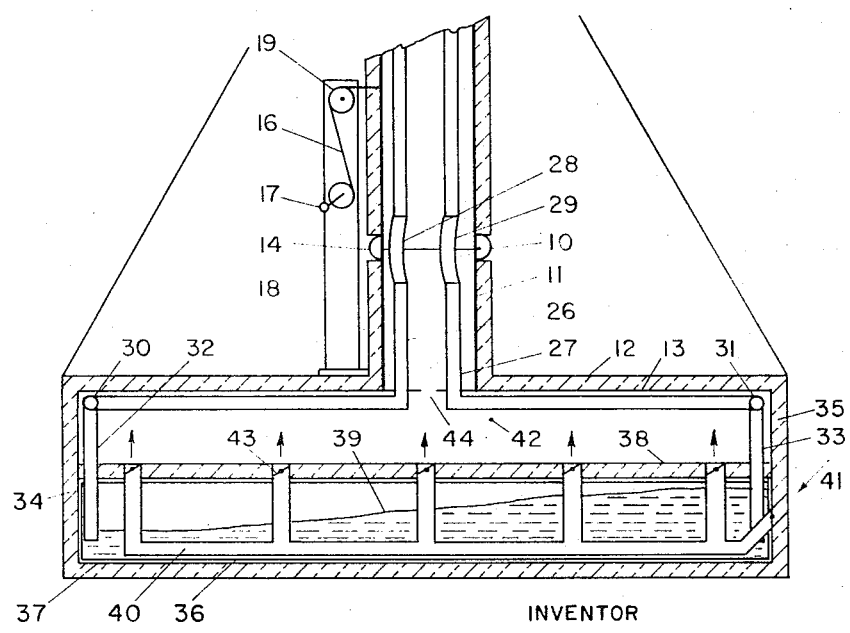

Omitted from these drawings and the following description are many construction details which, although very important for satisfactory service, are quite irrelevant in the context of this disclosure and appended claims. The diagrammatic sectional views are not to scale, their only purpose being that of showing the functional relationships existing between the various major components and that of identifying them.

In these drawings, 1 denotes an upper hollow column to which are secured several horizontal blades 2 having suitable aerodynamic sections and lengthwise slots 3 in their upper and lower surfaces. These slots reach the hollow interior of their respective blades and communicate with the bore of column 1 via suitable holes 4 located at the blade roots. The pressure reduction created by wind's passage along the slots 3, draws air from blades' interior and from upper column's bore. This suction is fundamental in the entire operation of the heating system.

The blade column 1 supports a tail vane 5 which orients the entire blade assembly into the wind by turning the blade column with respect to a middle column 6 which is provided with a housing 7 containing suitable bearings 8 and 9 located around the column and providing axial and radial support.

The middle tall column 6 has a hollow circular section and is attached at its lower end, via a hinge 10, to a lower cylindrical hollow column 11 secured to the roof 12 of the heat requiring enclosure 13. The column 6 is held upright by suitable latches 14 located near the hinge 10, by several cables 15 attached to the enclosure's roof 12 and by a cable 16 pulled with a winch 17 mounted on an auxiliary column 18, of a suitable cross section and rigidly secured to the enclosure roof 12. The cable 16 is guided by a pulley 19 mounted on the auxiliary column 18.

When the upper column 1 with the blades 2 has to be lowered for servicing, the latches 14 and the appropriate cables 15 are released and the cable 16 is unreeled until the column 6 swinging around the hinge 10 comes to rest on the roof. For erection, the column 6 is lifted until its angle enables the use of the winch.

The cyclic control valve 21 consists of a body 52 having two closed ends 53 and 54 surrounded by a lateral surface having four ports 55, 56, 57 and 58 located at regular 90° intervals. Two pipes 22 and 23 are connected respectively to the ports 55 and 57; port 56 is connected, via a rotary seal 20, to the base of the blade column 1 and port 58 communicates directly with the interior of column 6.

The hollow inside of the valve body 52 is divided in four symmetrical compartments 59, 60, 61 and 62 each facing one of the aforementioned ports. This division is obtained by plane semi-diagonal ribs stretching between the end covers 53 and 54. The ribs bounding the compartment 59 are joined all along their intersection edge and the same applies to the ribs bounding the compartment 61. The two intersection edges are separated by a narrow longitudinal empty space 63. The dividing ribs have suitably shaped passages 64, 65, 66 and 67 surrounded by suitable seating surfaces for a rectangular thin blade 68, inserted between the ribs and oscillating 90° around its axis which coincides with that of the narrow opening 63.

The blade 68 is supported in suitable bearings 69 and 70 located in the end covers 53 and 54 and is operated by a suitable enclosed mechanism 24 transforming the rotary motion of an electric motor 25 into the oscillating motion required by the blade 68. The blade moves rapidly between its two terminal positions and remains longer in these positions.

As illustrated, the blade covers the passages 64 ane 66, thereby connecting the bore of column 1 to the pipe 23 and the inside of column 6 to the pipe 22. The opposite takes place when the blade is switched to its alternate position.

As aforementioned, wind's passage over the blades 2, creates a depression which is applied to the interior of pipe 23 while that of pipe 22 receives the pressure existing within the column 6, pressure equal or slightly less than that existing within the enclosure 13. The pipes 22 and 23 are connected, at their lower ends to the lower pipes 26 and 27, via respective flexible tubes 28 and 29 which allow column swinging without disconnecting any pipes. The pipes 26 and 27 join respectively the manifolds 30 and 31 located along the wall-ceiling intersections.

These manifolds are joined, at regular intervals along their lengths, by vertical pipes 32 and 33 communicating with the interior of their respective mainfolds and descending, along their respective opposite walls 34 and 35 of the enclosure 13, into a tank 36 located in a thermally insulated compartment 37 below the floor 38 of the enclosure 13, and extending between the opposite walls 34 and 35.

This tank is divided in a number of interconnected narrow portions separated by baffles and each such division receives, at its wall ends, a pair of open-ended pipes 32 and 33 descending from their respective mainfolds.

The tank 36 contains a liquid 39 which is set in wavelike motion by the cyclic rising and falling of the liquid columns within the pipes 32 and 33. The opposed movements of the liquid columns are caused by the alternating pressures exerted on these columns via valve 21, one of these pressures being that existing within the column 6 and the other being that existing at the narrowest flow sections between the blades 2.

There are definite resonance frequencies which cause high amplitude oscillations in the entire mass of liquid and each such frequency is characterized by a certain wave pattern in the tank 36. The cyclic motions are accompanyied by shear stresses taking place at the inner and outer walls of the immersed pipes, at the tank's inner walls, at the dividing baffles and any other baffles installed to produce additional energy dissipation. The heat resulting from this viscous shearing elevates the liquid's temperature and can be transferred to other fluids.

The tank 36 contains a number of air heating ducts 40 immersed in the heat storing liquid 39 and receiving cold outside air through several controllable inlet ports 41 located in the wall of enclosure 13. The heated air is discharged into the upper compartment 42 of the enclosure 13, via controllable openings 43 located in the inside floor 38. The viciated air of the upper compartment 42 is exhausted through a controllable opening 44 in the base of the lower column 11, passes through the columns 11 and 6, through openings 45 at the upper end of column 6 and escapes through an opening 46 in the side-wall of an air exhauster cap 47 attached to the blade column 1 below its lowest blade. The air exhauster cap turns with the blade column thereby maintaining the escape opening 46 always in a downwind position.

Heat losses to the exterior are minimized by very well insulated walls, roof and outer floor, by a minimum number of doors and windows and by a layer of insulation 71 around the columns 6 and 11. Vapor penetration into the upper compartment 42 is prevented by a vapor barrier lining the inside walls of lower compartment 37 containing the tank 36 with its heat storing liquid.

Appreciable rates of air flow are possible thanks to the draft caused by the height of opening 46. Additional draft might be obtained by tapping a lower pressure area on the lowest blade. The quantity of heat storing liquid is determined by the maximum heat losses which have to be made for during the longest windless period and by the minimum admissable temperature within the upper compartment 42. A small, oil heating stove could be provided for emergency use.

The oscillations induced in the liquid 39 could be used for many other purposes than heating in which cases, the energy dissipation aspect should be kept to a minimum.

Further alternatives are offered by designs featuring vertical, wind orientable planes containing vertical blades, or coiled concentric blades or a long blade coiled in a spiral fashion and so on. Still further alternatives result from the many possible choices regarding the blade cross sections.

The aforementioned wind operated heating system could exploit winds of any intensity because it is relatively easy to build a strong column-blade assembly with non-rotating blades. The large quantities of energy recuperated during strong winds can offset the lower performance of this system and render it competitive with a wind motor operated heating system having an imposed upper limit on its energy recuperation capability and having a lower reliability due to its moving parts.

The reliability of the aforedescribed system can be improved by eliminating the wind orienting feature associated with the column-blade assembly. This is achieved by replacing the blades 2 with a stack of circular disks 48 having symmetrical convex surfaces secured to properly shaped inner ribs 49. These disks are secured with a regular spacing to the column 1 which traverses the disks at their centers.

The wind blowing from any direction, passes between the disks and creates a lower static pressure around their centers. This depression is communicated to the interior of column 1 via slots 50 in both surfaces of the disks and via holes 51 in the column wall. From here on, the system is identical to the previously described one and operates in an identical manner.

The choice of valve operating mechanism, considerations concerning the end use of the heated enclosure, its size, its construction, introduction of a hot water consumption system, of more sophisticated heat controls, and so on, do not affect in any way the appended claims.

What is claimed is:

1. A system for cyclically varying the heights of liquid columns confined in tubes, said system comprising an enclosure, a tank in said enclosure, a liquid in said tank, said liquid having a free surface exposed to air at a given static pressure, two banks of tubes partly immersed in said liquid, said tube banks being located at opposite ends of said tank, two identical manifolds, one above each of said tube banks and open to the interior of said tubes, a source of static pressure lower than that exerted above the free surface of said liquid and located midway between said manifolds, a four ported control valve located close to said source of lower static pressure, two of said ports being respectively connected to said two manifolds, a third port being open to the air space above said tank and the forth port being connected to the source of lower static pressure, four suitably shaped compartments in said control valve, four internal passages between said compartments, a suitable control blade in said control valve, said blade being capable of moving between two extreme positions each corresponding to a different pairing between the four ports, suitable motor means to switch said blade between two dwell positions coinciding with said extreme positions, said switching occurring cyclically and said blade establishing an air flow path between a manifold and the air space above the tank when said blade is in the dwell position of the first half of a cycle, and between same manifold and the source of lower static pressure when said blade is in the dwell position of the second half of the cycle, the other manifold being placed in simultaneously opposite conditions, said cyclic switching of the blade causing simultaneously opposite motions of said liquid in said two banks of tubes and generating waves in said tank and, motor speed control means for obtaining a cyclic operation adapted to the end use of said system.

2. A system as defined in claim 1 wherein the blade drive motor speed and the magnitude of the lower static pressure could be altered at will.

3. A system as defined in claim 1 wherein the source of lower static pressure comprises converging-diverging passages between solid walls, a primary fluid flowing through said passages and creating static pressure variations along said passages, wall apertures when the passages have their minimum cross sections, said apertures being subjected to a lower static pressure than that exerted in the air space above the tank when the flow of primary fluid is sufficiently fast and, a duct communicating with all said apertures.

4. A system as defined in claim 3 wherein the primary fluid is atmospheric air.

5. A system as defined in claim 4 and adapted for heating purposes, wherein the converging-diverging passages are created with several aerodynamically shaped blades positioned at regular intervals above each other and secured to an upright hollow column located in the atmosphere and provided with a wind vane in a perpendicular plane to the blades' length, said column being vertically and rotatably mounted at the top of a tall structure erected above the tank containing enclosure and provided with servicing means, wherein the duct communicating with all said apertures consists of said hollow column, wherein the control valve is located at the base of the hollow column and one of its ports communicates with said column's interior via a rotary joint, wherein the tank contains many baffles and several ducts immersed in the liquid, said ducts confining the flow of a heat transport fluid which is suitably circulated in said enclosure, wherein the blade drive motor speed is chosen to produce cyclic motions of the liquid in said tubes, motions which lead to a maximum of friction between said liquid and the solid walls and, wherein the tank containing enclosure and the tank are thermally insulated.

6. A system as defined in claim 4 and adapted for heating purposes, wherein the converging-diverging passages are created with several horizontal hollow disks having symmetrical convex surfaces, said disks being positioned at regular intervals above each other and secured to a central hollow column located in the atmosphere and mounted vertically at the top of a tall structure erected above the tank containing enclosure and provided with servicing means, wherein the duct communicating with all said apertures consists of said hollow column, wherein the control valve is located at the base of the hollow column and one of its ports communicates directly with said column's interior, wherein the tank contains many baffles and several ducts immersed in the liquid, said ducts confining the flow of a heat transport fluid which is suitably circulated in said enclosure, wherein the blade drive motor speed is chosen to produce cyclic motions of the liquid in said tubes, motions which lead to a maximum of friction between said liquid and the solid walls and, wherein the tank containing enclosure and the tank are thermally insulated.

7. A system as defined in claim 5, wherein the tank containing enclosure has a living space with a thermally insulated floor separating it from the tank, wherein the tall structure contains a short hollow column secured to the roof of said enclosure, a tall hollow column hinged to said short column and provided with a top platform for supporting the column blades assembly, two pipes descending within said hollow columns and containing flexible portions at the column hinge section, each said pipe originating from a control valve port, said pipes continuing along the ceiling of the heated enclosure until each of them joins its respective manifold located along opposite ceiling-wall intersections, wherein the heat transport fluid is outside air admitted into the ducts immersed in the tank, delivered heated and in controlled quantity to the living space and eventually exhausted through the base of said short column, the bore of both said columns, openings at the upper end of said tall column and through a properly oriented side opening in a cap secured to and rotating with the column blades assembly and, wherein the servicing means consist of an auxiliary column erected above said enclosure and equipped with a winch whose cable guided by a pulley located at the top of said auxiliary column, is attached to said tall column.

8. A system as defined in claim 6, wherein the tank containing enclosure has a living space with a thermally insulated floor separating it from the tank, wherein the tall structure contains a short hollow column secured to the roof of said enclosure, a tall hollow column hinged to said short column and provided with a top platform for supporting the column-disks assembly, two pipes descending within said hollow columns and containing flexible portions at the column hinge section, each said pipe originating from a control valve port, said pipes continuing along the ceiling of the heated enclosure until each of them joins its respective manifold located along opposite ceiling-wall intersections, wherein the heat transport fluid is outside air admitted into the ducts immersed in the tank, delivered heated and in controlled quantity to the living space and eventually exhausted through the base of said short column, the bore of both said columns and openings at the upper end of said tall column and, wherein the servicing means consist of an auxiliary column erected above said enclosure and equipped with a winch whose cable guided by a pulley located at the top of said auxiliary column, is attached to said tall column.

* * * * *